US012129103B1

(12) United States Patent
Aiken

(10) Patent No.: US 12,129,103 B1
(45) Date of Patent: Oct. 29, 2024

(54) APPARATUS AND METHOD FOR STORING, MEASURING AND DISPENSING SEMI-SOLID FOOD SUBSTANCES

(71) Applicant: John Edward Aiken, Monroeville, PA (US)

(72) Inventor: John Edward Aiken, Monroeville, PA (US)

( * ) Notice: Subject to any disclaimer, the term of this patent is extended or adjusted under 35 U.S.C. 154(b) by 0 days.

(21) Appl. No.: 18/599,441

(22) Filed: Mar. 8, 2024

Related U.S. Application Data

(60) Provisional application No. 63/450,854, filed on Mar. 8, 2023.

(51) Int. Cl.
| | | |
|---|---|---|
| *G01F 19/00* | (2006.01) | |
| *B65D 83/00* | (2006.01) | |
| *B65D 43/02* | (2006.01) | |
| *B65D 85/72* | (2006.01) | |

(52) U.S. Cl.
CPC ....... *B65D 83/0005* (2013.01); *G01F 19/005* (2013.01); *B65D 43/0231* (2013.01); *B65D 85/72* (2013.01)

(58) Field of Classification Search
CPC B65D 83/0005; B65D 43/0231; B65D 85/72; G01F 19/005
See application file for complete search history.

(56) References Cited

U.S. PATENT DOCUMENTS

| | | | | |
|---|---|---|---|---|
| 2,175,747 A | * | 10/1939 | Dodd | G01F 19/005 222/323 |
| 2,256,865 A | * | 9/1941 | Gilbert | G01F 19/005 73/429 |
| 2,328,995 A | * | 9/1943 | Olds | G01F 19/005 222/49 |
| 2,583,808 A | * | 1/1952 | Bernhardt | G01F 19/005 73/429 |
| 2,642,744 A | * | 6/1953 | Thomas | G01F 19/005 126/30 |
| 4,981,041 A | | 1/1991 | Merkle | |
| 6,026,685 A | | 2/2000 | Weterrings et al. | |
| 11,142,372 B2 | | 10/2021 | Ho | |
| 2002/0097953 A1 | | 5/2002 | Judith | |
| 2015/0183570 A1 | * | 7/2015 | Chen | B65D 25/56 220/661 |

FOREIGN PATENT DOCUMENTS

| | | | | |
|---|---|---|---|---|
| CN | 104417931 A | * | 3/2015 | |
| CN | 106643960 A | * | 5/2017 | |
| CN | 116081117 A | * | 5/2023 | |

* cited by examiner

*Primary Examiner* — Bob Zadeh

(57) ABSTRACT

The present invention provides an apparatus for storing, measuring and dispensing a desired quantity of semi-solid food, the apparatus being based on piston base with peripheral contact inside a rigid circular sleeve configured for storing at least 600 cubic centimeters of a semi-solid food substance k above the piston base inside the rigid circular cylinder. After filling, the apparatus is configured to enable pushing food material out the top of the cylinder toward the arm on a graduated rod until the desired preset quantity is above the top rim of the cylinder. That material can then be sliced of at the rim level for use and an included lid installed on the top rim of the circular cylinder to cover the remaining food material.

8 Claims, 6 Drawing Sheets

APPARATUS AND METHOD FOR STORING, MEASURING AND DISPENSING SEMI-SOLID FOOD SUBSTANCES

CROSS REFERENCE TO RELATED APPLICATION

This patent application is related to and claims priority from U.S. Provisional Patent Application Ser. No. 63/450,854 filed Mar. 8, 2023.

FIELD OF THE INVENTION

The present invention relates, in general, to food storage and measuring, and, more particularly, this invention relates to an apparatus for storing, measuring and dispensing many semi-solid food substances.

PRIOR ART

There is on the market a food measuring cylinder of limited capacity with no lid. When being filled, it is tall and narrow and prone to tipping over. Also, it needs to be filled and cleaned for each use. In U.S. Pat. No. 6,026,685, Weterrings et al recognized some of these shortcomings and offered instead telescopic cylinders with a larger and elliptical cross section. However, Wetterrings elliptical shape rules out the most secure lid attachment, threaded parts. Obviously, Wetterrings is teaching away from storage, and the volume to be dispensed is set before the food material is added. Merkle in U.S. Pat. No. 4,981,041 discloses a measuring and dispensing device for semi-solid materials such as shortening. Merkle teaches a tubular body open at both ends and a plunger about the same length and fitting tightly inside the tubular body. After the tubular body is filled with the semi-solid material, the plunger is pushed down to the graduated mark for the volume desired. There are no provisions for storing material in the device and it must be filled and cleaned afterward for each us. In US Patent Application Publication 2002/0097953, Judith discloses an adjustable measuring device having an outer tubular member and a piston-like member entirely inside the outer member such that it can be pushed upward along a number of measuring stop along the inside wall of the outer tubular member. The user must remember or write down the starting and ending measurement points, thus creating the potential for error. Also, there are no provisions for storing. Ho is U.S. Pat. No. 11,142,372 discloses a telescopic container with a lid, but there is no capability for measuring.

BACKGROUND OF THE INVENTION

Prior to the conception and development of the present invention, most semi-solid cooking ingredients such as peanut butter and shortening have been measured with a standard measuring cup by spooning from its storage container. This creates difficulty getting all the material out of the measuring cup and also a difficult-to-clean mess. Thus, there is also some wastage of the desired material left in both the container and the measuring cup. Devices on the market or otherwise disclosed are limited to a single dispensing for each filling. In spite of a substantial amount of prior art, there has been until now a long-standing need for an apparatus that can store a substantial quantity of semi-solid food substances with essentially no air space above and reliably dispense multiple quantities of the food substance before needing to be refilled. This will render the apparatus useful for ice cream also to eliminate frost on top.

SUMMARY OF THE INVENTION

The present invention provides a circular cylindrical container with a resealable lid configured for storing at least 600 cubic centimeters (cc) (about 18 ounces) of a semi-solid food material above a piston in the cylinder. An adjustable graduated measuring rod with an elongated arm at 90 degrees is movable along the exterior wall of the cylindrical container to set the stop point for the selected quantity to be dispensed. Upon user actuation of a piston-pushing means, the piston pushes the food material out the top of the cylinder until the upper surface of the desired quantity touches the underside of the 90-degree arm. That material can then be sliced off into a mixing bowl at the rim level and the lid reinstalled at the top rim.

OBJECTS OF THE INVENTION

It is, therefore, one of the primary objects of the present invention to provide a food ingredient storage container for at least 18 ounces of semi-solid food substance with built-in dispensing capability for a desired quantity.

Another object of the present invention is to provide a storage device for semi-solid ingredients with an adjustable measurement capability that does not need cleaned every time it dispenses the measured quantity.

Still another object of the present invention is to provide an apparatus that results in less wastage of semi-solid food material.

Yet another object of the present invention is to store food material with essentially no air space above before and after dispensing.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures.

Figure 1:
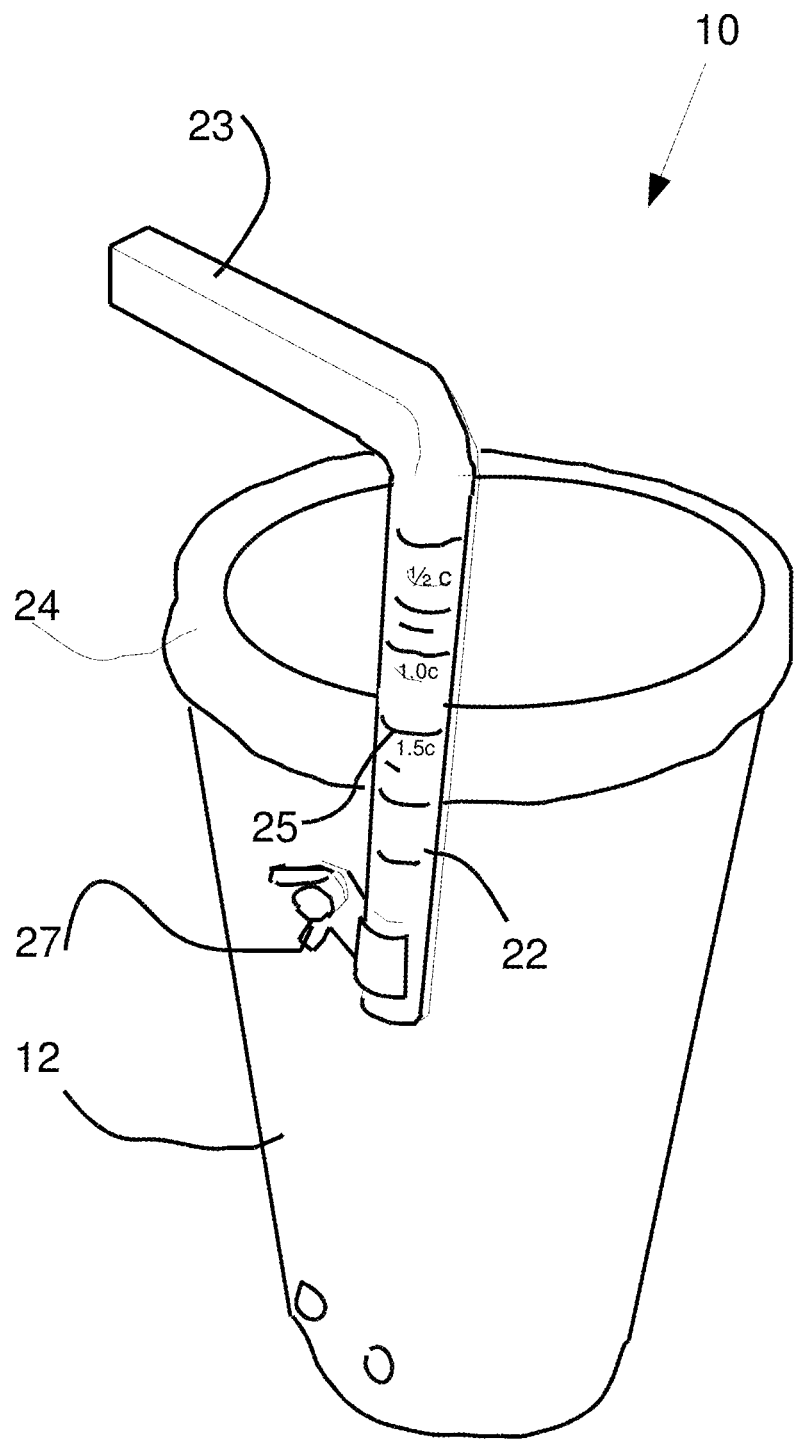
FIG. 1 provides a perspective view okf one embodiment of the present apparatus.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, very similar components which have identical functions have been identified with identical reference numerals throughout the several views illustrated in the drawing figures.

Referring initially to FIG. 1, this provides a perspective view of the present apparatus 10. A rigid circular cylinder body 12 has a diameter about the half that of the height such as to provide sufficient interior volume to hold at least an 18-ounce jar, preferably 24-oz, of peanut butter or the like, such as shortening. Prior to dispensing, the lid 24 is removed. The measurement rod 22 with a horizontal arm 23 is pushed up and set above the rim to the desired quantity of food material. The gradations 25 on the measurement rod 22 correspond to specific volumes of food to be dispensed, and the corresponding volume is lined up with the upper rim of the cylinder and the wing nut 27 tightened. The food substance is then pushed up to the underside of the horizontal arm 23, followed by cutting off the set quantity at the upper rim with a thin flipper. The lid 24 is put back on for storage of material for later use.

Figure 2:
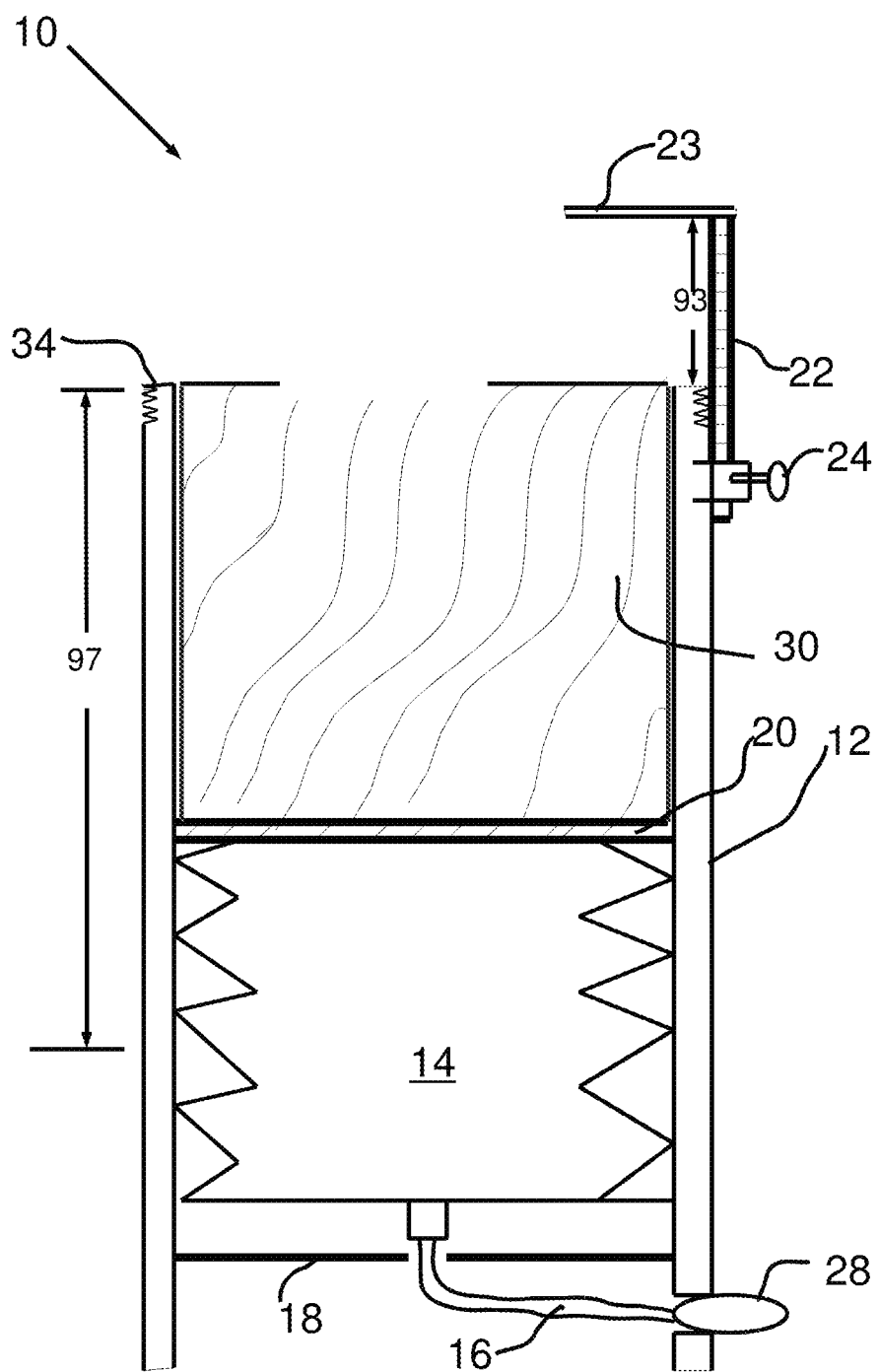
FIG. 2 is a sectional elevation view of the present invention.

FIG. 2 is a sectional elevation view of an alternative embodiment of the present invention 10 illustrating a condition just prior to measuring the desired quantity. The rigid cylinder 12 has a support member 18 for holding in place the air bladder 14. The cylinder 12 has a diameter and depth 97 when the bladder 14 is fully compressed to create a volume significant to hold up to a 24-ounce jar of peanut butter or the like. Above the air bladder 14 is a piston 20 which is configured to push up semi-solid food material 30 as the bladder 14 is inflated via air hose 16. Shown is a rubber squeeze bulb 28 for inflation, but other means can be employed, even just blowing into it. The measuring rod 22 has been elevated to a height 93 corresponding to the desired volume as indicated on graduations along the measuring rod 22. The horizontal arm 23 has been positioned above the substance to be measured so that the user knows when to stop inflating. The thumbscrew 27 locks that position.

Figure 3:
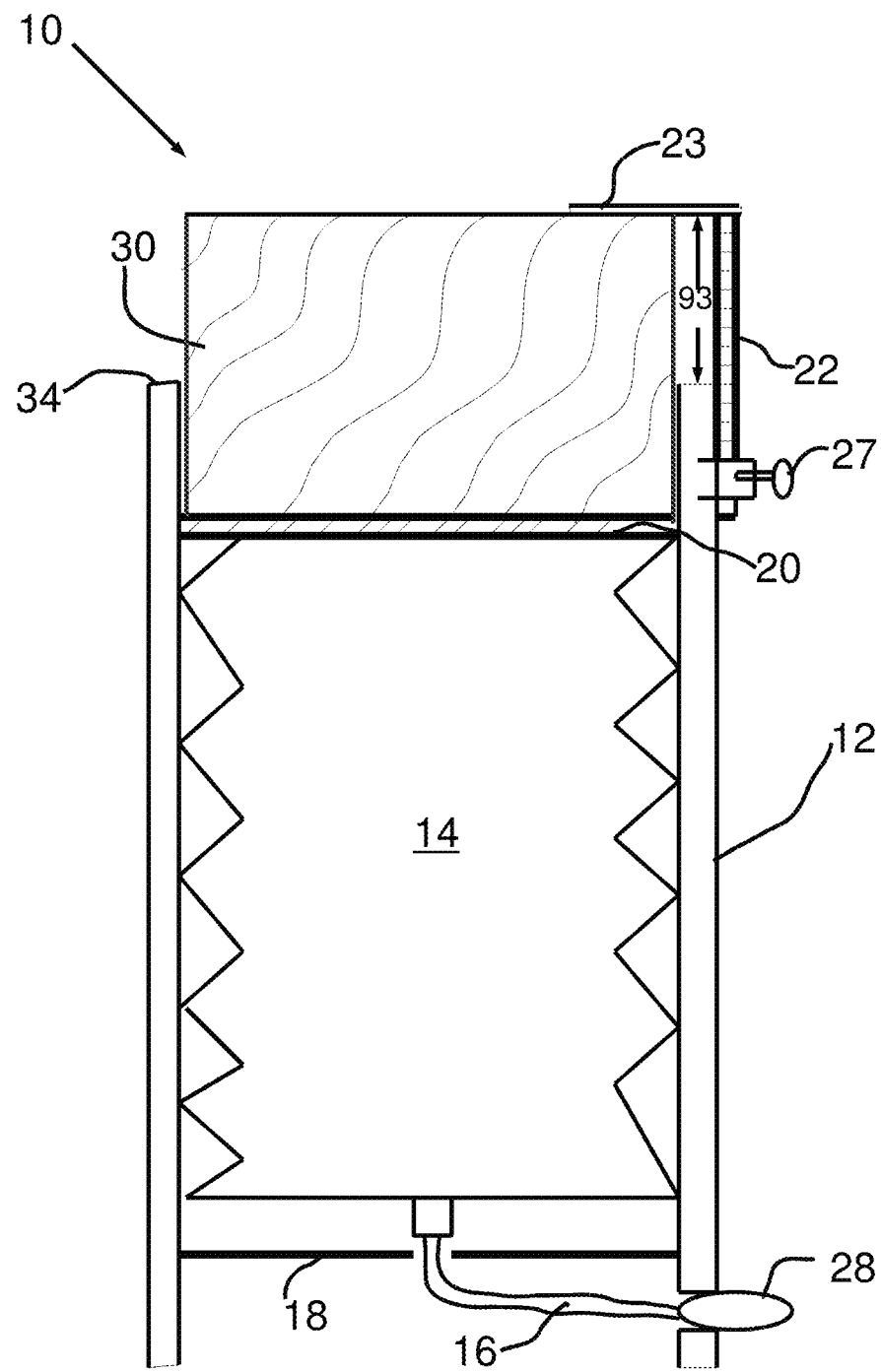
FIG. 3 is another sectional elevation view of the present invention.
Figure 4:
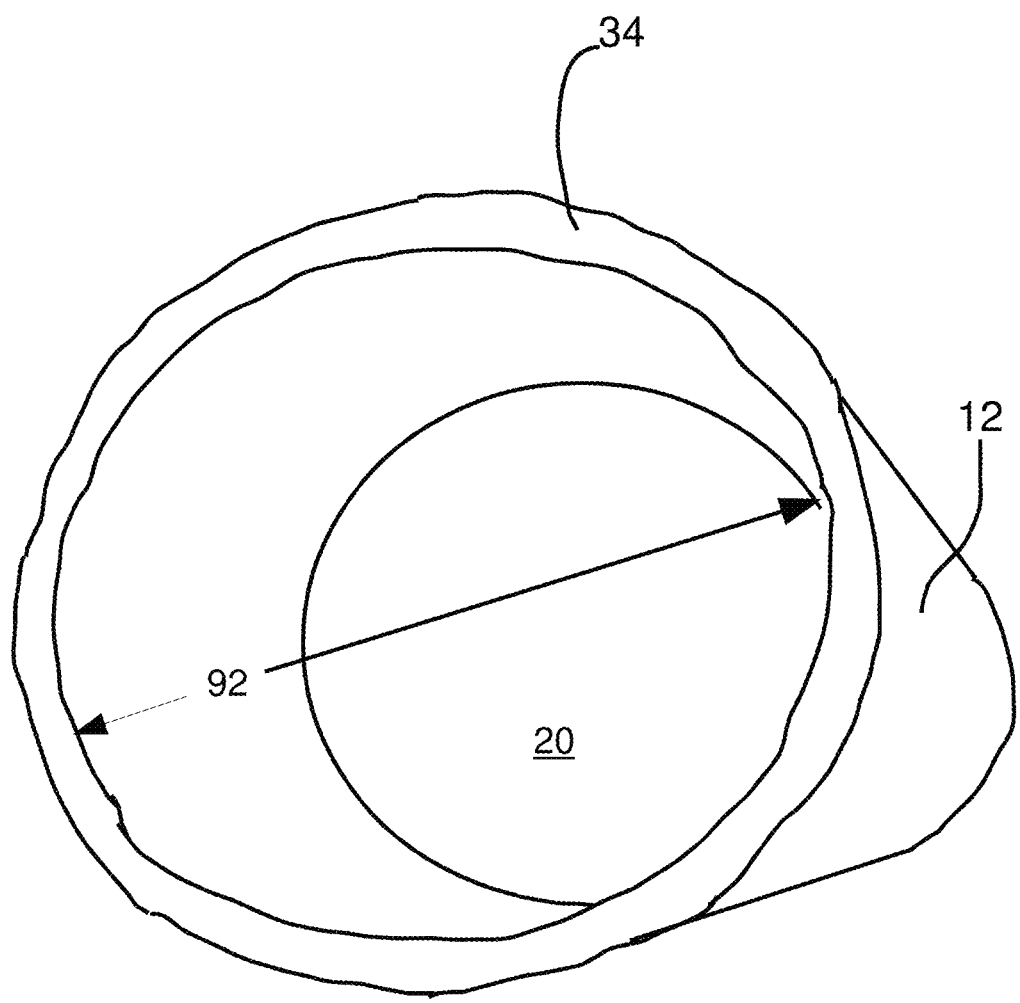
FIG. 4 is a perspective view of the interior of the apparatus prior to admitting food material.

FIG. 3 is a sectional elevation view of the present invention 10 illustrating a condition after measuring the desired quantity but before dispensing it. The rigid cylinder 12 has a support member 18 for holding in place the air bladder 14. Above the air bladder 14 is a piston 20 which is configured to push up semi-solid food material 30 as the bladder 14 is inflated via air hose 16. Shown is a rubber squeeze bulb 28 for inflation FIG. 4 is a perspective view of the interior of the apparatus prior to admitting food material. The piston 20 can be pushed down manually inside the cylinder 12, or the sleeve cylinder 12 pulled up to create the storage space. That space will have a diameter 92 and a similar depth that combine to create a volume sufficient to hold at least 600 cc (about 18 ounces), preferably 800 cc, of a semi-solid food material such that the entire contents of a jar can be added all at once, generally by splitting the container and placing all contents in at once. This may be facilitated by at least partial freezing of the jar. In order to provide the specified minimum volume without creating an unstable height when full, the diameter needs to be above a minimum of 8 centimeters. Nearly ideal would be a diameter 92 of 10 cm accompanied by a storage space depth of about 10 cm. Note that when filled, the overall height of the apparatus will be about twice the depth of the storage chamber. Also, it will be top heavy because the food substance will only be in the upper portion. These aforementioned issues and solutions are not readily discernable a priori, and the notion that it would be obvious to alter dimensions to the ranges specified herein is not applicable here, to which the prior art attests.

Figure 5:
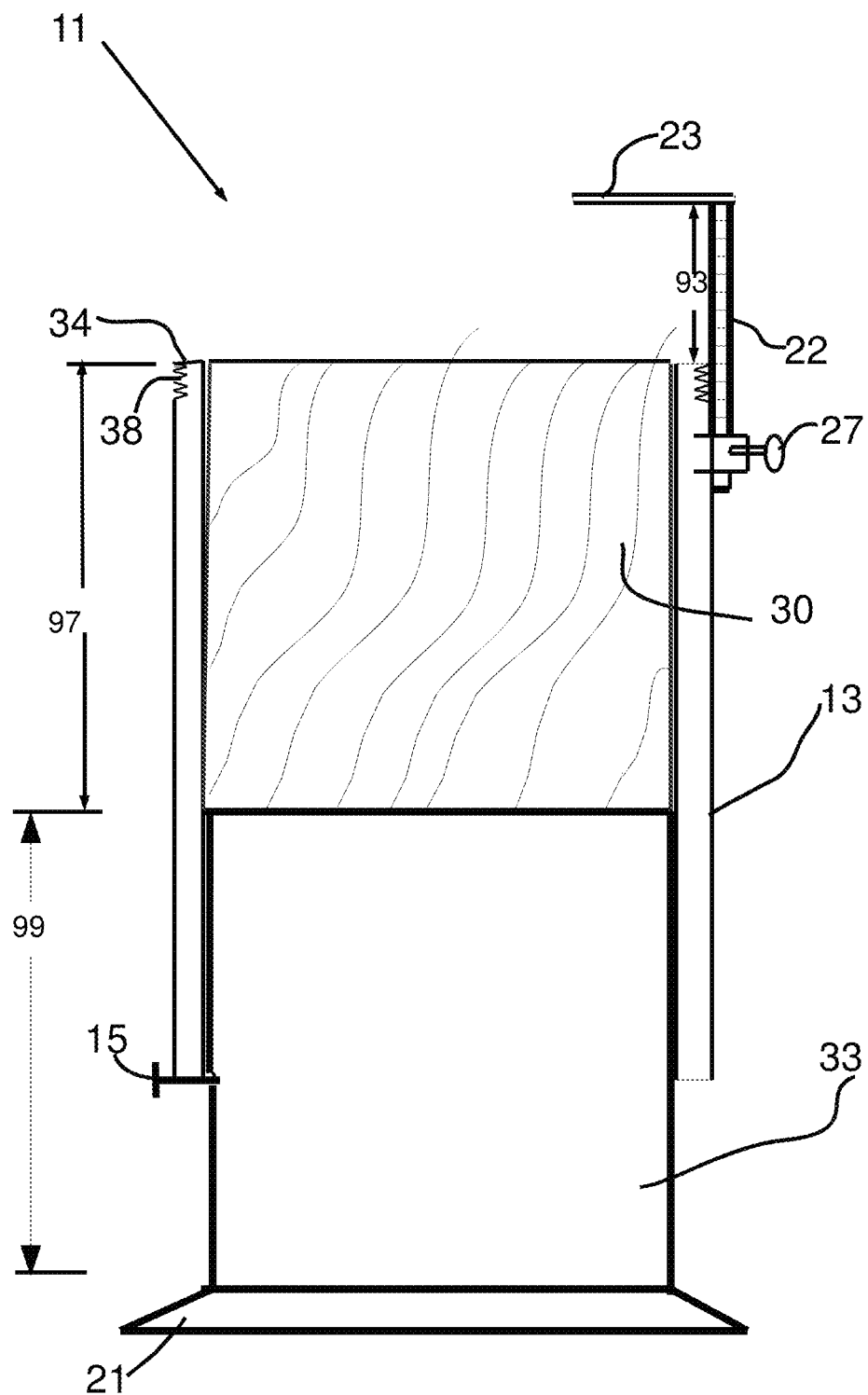
FIG. 5 provides an elevation sectional view of a preferred embodiment of the present invention incorporating a piston-in-sleeve apparatus with an adjustable external measuring device.
Figure 6:
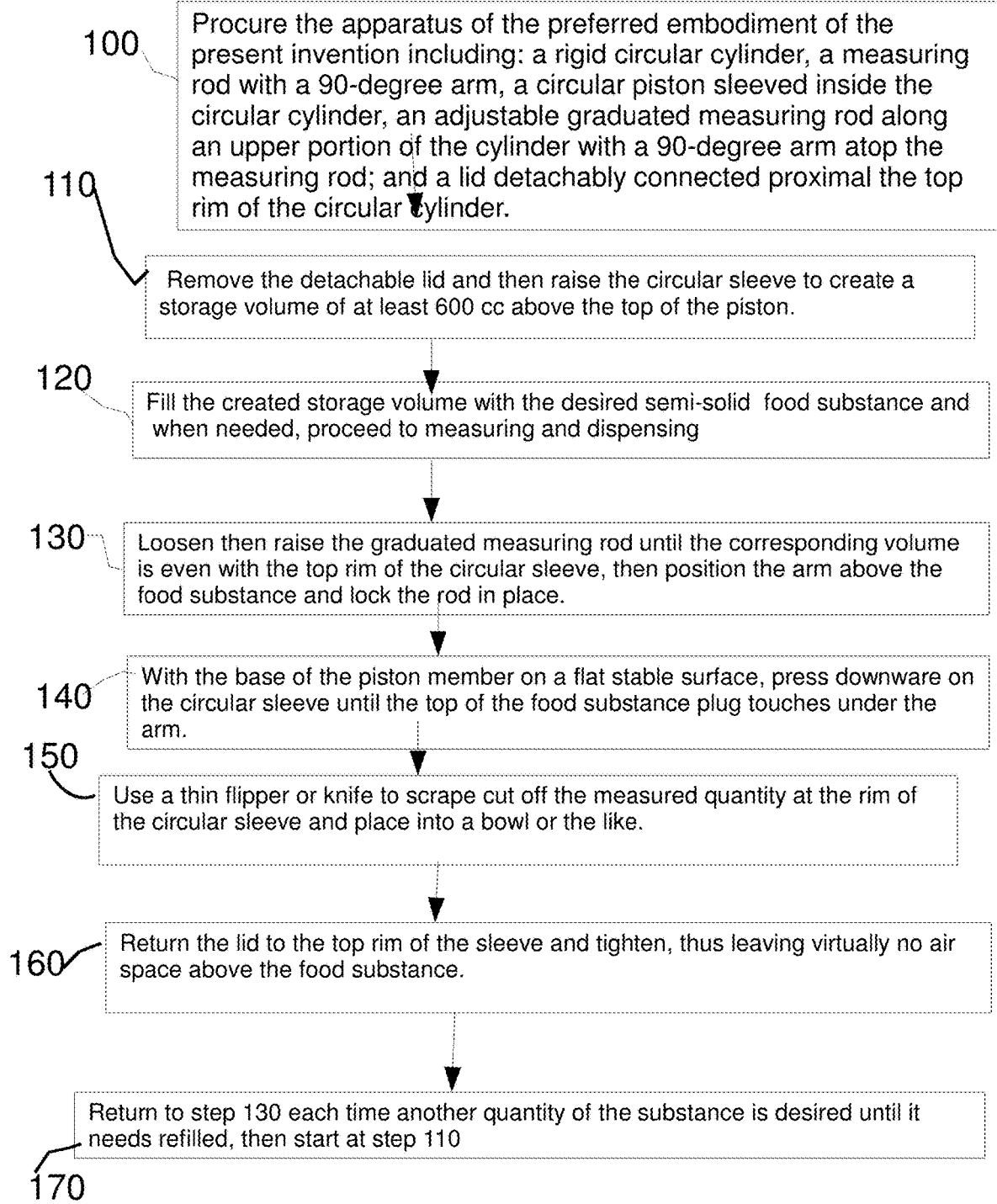
FIG. 6 is a flow diagram for the method of the present invention using a preferred apparatus of the invention.

FIG. 5 provides an elevation sectional view of a preferred embodiment 11, after removing a lid, having a circular telescopic piston-in-sleeve apparatus with an adjustable external measuring device which includes a graduated rod 22, a 90-degree horizontal arm 23 at the upper end of the rod, and hardware 27 for loosening and tightening the graduated rod 22. In this embodiment, the piston base 33 is hollow and has a flared base 21. This adds to standing stability and facilitates pressing the outer storage sleeve 13 downward to dispense stored food material 30. To enable essentially all of the stored material to eventually be pushed out the top of the storage sleeve 13, the straight-side length of the piston 99 should be nearly the same as the storage space depth 97. A detent device 15 indicates where to stop for filling, but still permits the bottom rim of the storage sleeve 13 to be pushed all the way to the flared base 21. The lid (24 in FIG. 1) can be screwed on utilizing the threads 38 proximal the top rim 34 of the outer storage sleeve.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from the spirit of the invention or the claims herein.

I claim:

1. An apparatus for storing and dispensing measured amounts of semi-solid food substances comprising:
   a) a rigid-wall cylinder having a predetermined inside diameter, and a predetermined depth;
   b) a rigid circular piston having an outside diameter between 98 and 100 percent of the predetermined inside diameter and configured such that the periphery of the circular piston can slide along the inside wall of the rigid-wall cylinder;
   c) an elongated graduated measuring rod slidingly engaged to an outer wall of the rigid-wall cylinder, the graduated measuring rod having an arm at one end at 90 degrees to an axis of the elongated graduated measuring rod;
   d) a piston-moving means wherein the piston-moving means comprises a support member spanning the predetermined inside diameter adjacent an end of the rigid-wall cylinder, and an inflatable bladder positioned between the support member and the circular piston and configured to push the circular piston and material supported in it away from the support member; and
   e) a lid detachably covering an end of the rigid-wall cylinder at an upper rim.

2. The apparatus of claim 1 wherein the lid and rigid-wall cylinder have mating threads adjacent the upper rim of the cylinder.

3. The apparatus of claim 1 wherein the piston-moving means is the inflatable bladder operably connected to a flexible tube with a hand squeeze bulb.

4. An apparatus for storing and dispensing measured amounts of semi-solid food substances comprising:
   a) a rigid hollow circular piston having an upper portion with a first outside diameter and a predetermined height, the circular piston further having a flared base;
   b) a rigid-wall sleeve open at both ends and having and an inside diameter such that the sleeve is in sliding contact with the periphery of the circular piston;
   c) an elongated graduated measuring rod slidingly engaged to an outer wall of the rigid-wall cylinder, the measuring rod having an arm at one end at 90 degrees to an axis of the elongated graduated measuring rod; and d) a lid detachably covering an end of the rigid-wall cylinder at an upper rim.

5. The apparatus of claim 4 wherein the first outside diameter is between 8 and 10 cm.

6. The apparatus of claim 5 wherein the predetermined height is between 9 and 11 centimeters.

7. The apparatus of claim 6 wherein the rigid-wall sleeve further includes a detent device to create a storage depth limited to the predetermined height.

8. A method for measuring and dispensing a portion of semi-solid food substance stored in a specific apparatus, the steps including:

i) procuring the apparatus comprising a) a rigid hollow circular piston having an upper portion with a first outside diameter and a predetermined height, the circular piston further having a flared base; b) a rigid-wall sleeve open at both ends and having an inside diameter such that the sleeve is in sliding contact with the periphery of the circular piston; c) an elongated graduated measuring rod slidingly engaged to an outer wall of the rigid-wall cylinder, the measuring rod having an arm at one end at 90 degrees to an axis of the elongated graduated measuring rod; and d) a lid detachably covering an end of the rigid-wall cylinder at an upper rim, ii) Removing the detachable lid, then raising the rigid-wall sleeve above the circular piston encompassing in the sleeve to create a storage volume of at least 600 cc, iii) Filling the storage volume with a desired semi-solid food substance, Iv) Replacing the detachable lid or proceed to measuring the desired portion;

v) Loosening then raising the graduated measuring rod until a predetermined volume is even with the upper rim of the circular sleeve, then positioning the arm above the food substance and lock the measuring rod in place, vi) With the base of the piston member on a flat stable surface, pressing down on the circular sleeve until a top of the food substance portion touches an underside of the arm, vii) Using a thin flipper or knife to scrape cut off the measured portion at the rim of the circular sleeve and place into a bowl, viii) Returning the lid to the upper rim of the sleeve and tightening, thus leaving no air space above the food substance.

\* \* \* \* \*